(No Model.)
R. F. SILLIMAN.
ELECTRICAL CONDUCTOR AND INSULATING CONDUIT.
No. 389,943. Patented Sept. 25, 1888.
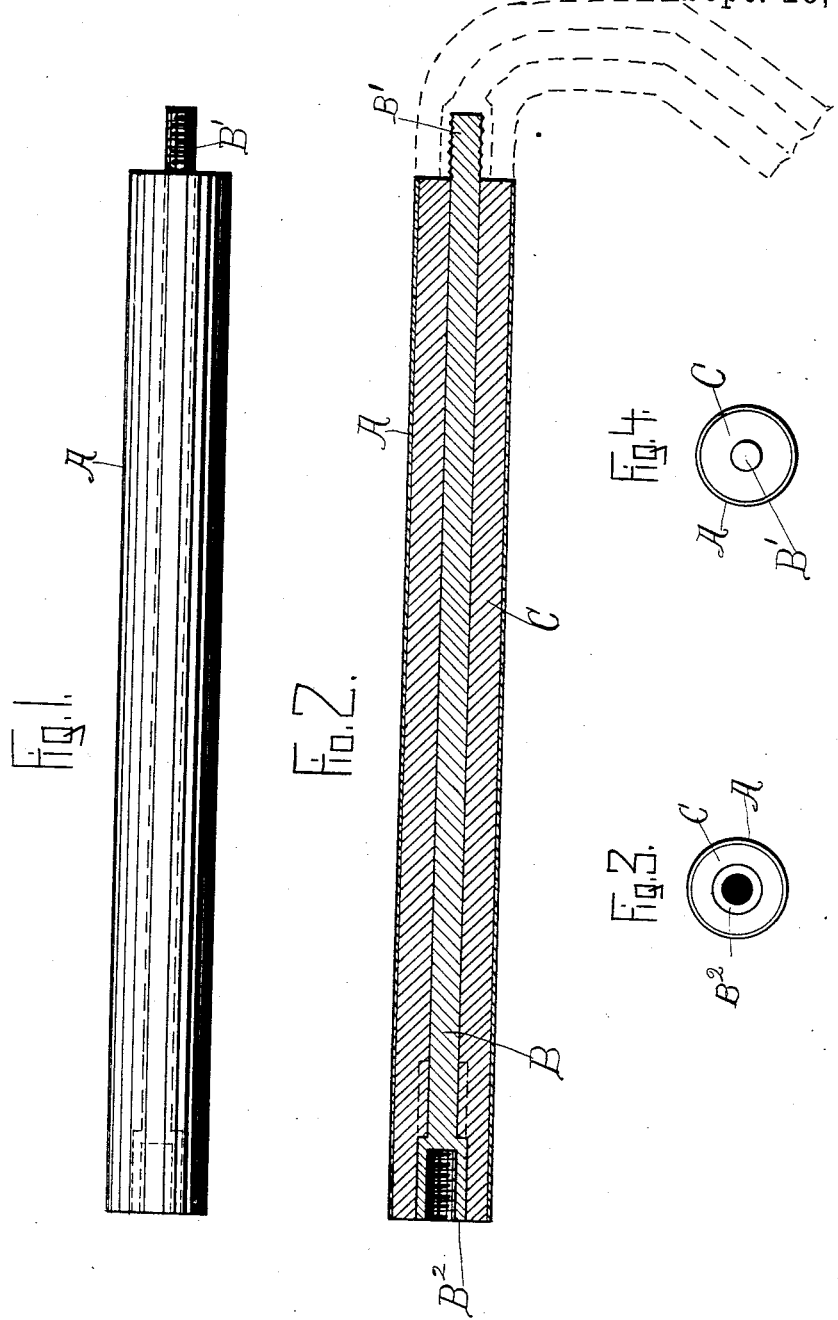

UNITED STATES PATENT OFFICE.

ROBERT F. SILLIMAN, OF TROY, NEW YORK.

ELECTRICAL CONDUCTOR AND INSULATING-CONDUIT.

SPECIFICATION forming part of Letters Patent No. 389,943, dated September 25, 1888.

Application filed December 9, 1887. Serial No. 257,382. (No model.)

*To all whom it may concern:*

Be it known that I, ROBERT F. SILLIMAN, a resident of the city of Troy, in the county of Rensselaer and State of New York, have invented certain new and useful Improvements in Electrical Conductors and Insulating-Conduits; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in single-line electrical conductors and insulating-conduits; and it consists of the novel construction and combination of parts hereinafter described, and pointed out in the claim.

Figure 1 of the drawings is a plan view of a section of my improved conductor and conduit. Fig. 2 is a longitudinal central section of same. Fig. 3 is an end view viewed from the left, showing the tapped end of the conductor. Fig. 4 is a view of the opposite end.

I have heretofore inclosed a plurality of electrical conductors within an insulating-conduit for carrying the conductors underground and made the conductors and inclosing-conduit in sections with differing means for connecting the sections, as described in a prior application for a United States patent.

The object of my present invention is to provide in sections, which can be easily and quickly connected or disconnected, a single-line conductor having an insulating-conduit. Each section is made up of a tube, A, electrical conductor B, and insulating material C. The tube may be made of any material, though metal tubing is preferred on account of its strength and cheapness.

The conductor may be made of any of the materials known as conductors of electricity, though metallic wire is preferred on account of its strength and cheapness and small resistance to the passage of electrical currents. The shape and position of that part of the conductor inclosed by the tube are shown by dotted lines in Figs. 1 and 2. It will be seen that one end, B', projects beyond the tube and is screw-threaded. The opposite end, B², of the conductor is tapped and interiorly threaded to receive a screw, like B'. The insulating material may be made of any of the substances known as non-conductors of electricity, though preferably of some substance which can be easily and quickly changed from a fluid or plastic state to a solid condition, as rubber or resin.

The method of construction is very simple, it only being necessary to insert the conductor threaded at one end and tapped at the other within the tube and hold it centrally therein until the tube is filled with the insulating material, which surrounds the conductor and affords it a perfect insulation and at the same time firmly fixes its position in the tube.

A single-line conductor of any desired length can be easily and quickly formed by screwing together the required number of sections, the projection B' being inserted in the tapped end of the preceding section, as indicated by the dotted lines in Fig. 2.

When desired, the coupling, which is interiorly threaded to receive a screw projection, may be a separate piece, forming a ferrule to be screwed or soldered onto the inclosed end of the conductor, in which case it should be of sufficient length to be firmly secured to the conductor, as indicated by dotted lines at the left hand of Fig. 2. It will be observed that each section is complete in itself; that no nuts or bolts or any separate piece are required to secure the sections together; that no tools are needed to make up the line, as each successive section can be easily secured to the line by turning the section with the hands to screw the projecting end of one section into the tapped end of another section.

I do not wish to be limited to any particular form for the section, as it may be extended in a straight, angular, or curved direction, as indicated by dotted lines at the right-hand end of Fig. 2.

What I claim as new, and desire to secure by Letters Patent, is—

A single-line electrical conductor and insulating-conduit composed of sections, each section consisting of an electrical conductor, screw-threaded at one end and correspondingly screw-tapped at the other end, embedded in an insulating material inclosed in a tube shorter than the conductor, whereby one end of the conductor projects beyond the contiguous end of the tube, the several sections so formed being connected, and electrical contact between the respective conductors maintained by screwing the threaded ends into the contiguous tapped ends of the successive conductors, substantially as described.

In testimony whereof I have hereunto set my hand this 5th day of December, 1887.

ROBERT F. SILLIMAN.

Witnesses:
GEO. A. MOSHER,
CHAS. L. ALDEN.